(12) United States Patent
Woiler et al.

(10) Patent No.: US 8,733,540 B2
(45) Date of Patent: May 27, 2014

(54) EXCITED FRAME VIBRATORY CONVEYOR

(71) Applicants: Chris Woiler, College Place, WA (US); Dean Dunham, Walla Walla, WA (US); Mark Schmidtgall, Athena, OR (US); Jeff Brant, Walla Walla, WA (US); Tim Rickard, West Minster, CO (US); Chuck Jameson, Milton-Freewater, OR (US)

(72) Inventors: Chris Woiler, College Place, WA (US); Dean Dunham, Walla Walla, WA (US); Mark Schmidtgall, Athena, OR (US); Jeff Brant, Walla Walla, WA (US); Tim Rickard, West Minster, CO (US); Chuck Jameson, Milton-Freewater, OR (US)

(73) Assignee: Key Technology, Inc., Walla Walla, WA (US)

( * ) Notice: Subject to any disclaimer, the term of this patent is extended or adjusted under 35 U.S.C. 154(b) by 8 days.

(21) Appl. No.: 13/648,957

(22) Filed: Oct. 10, 2012

(65) Prior Publication Data

US 2014/0097065 A1 Apr. 10, 2014

(51) Int. Cl.
*B65G 27/20* (2006.01)

(52) U.S. Cl.
USPC ........................ 198/766; 198/759; 198/760

(58) Field of Classification Search
USPC .............. 198/752.1, 758, 759, 760, 763, 766
See application file for complete search history.

(56) References Cited

U.S. PATENT DOCUMENTS

| | | | | | |
|---|---|---|---|---|---|
| 3,583,246 | A | * | 6/1971 | Stahle et al. | 74/61 |
| 3,659,465 | A | * | 5/1972 | Oshima et al. | 74/61 |
| 3,687,420 | A | * | 8/1972 | Schweinfurth et al. | 366/109 |
| 4,768,647 | A | * | 9/1988 | Lehtola | 198/760 |
| 5,265,730 | A | * | 11/1993 | Norris et al. | 209/326 |
| 5,547,068 | A | * | 8/1996 | Spurlin | 198/760 |
| 5,713,457 | A | * | 2/1998 | Musschoot | 198/753 |
| 5,762,176 | A | * | 6/1998 | Patterson et al. | 198/770 |
| 5,802,965 | A | * | 9/1998 | Lin | 99/517 |
| 6,041,915 | A | * | 3/2000 | Fishman et al. | 198/766 |
| 6,308,822 | B1 | * | 10/2001 | Moran et al. | 198/762 |
| 6,349,817 | B1 | * | 2/2002 | Wadensten | 198/770 |
| 6,598,734 | B1 | * | 7/2003 | Rosenstrom | 198/770 |
| 6,655,523 | B2 | * | 12/2003 | Jones et al. | 198/770 |
| 6,659,267 | B2 | * | 12/2003 | Patterson | 198/771 |
| 6,851,548 | B1 | * | 2/2005 | Dumbaugh | 198/770 |
| 6,868,960 | B2 | * | 3/2005 | Jones | 198/770 |
| 7,387,198 | B2 | * | 6/2008 | Thomson | 198/770 |
| 7,669,717 | B2 | * | 3/2010 | Sumi | 206/710 |

* cited by examiner

*Primary Examiner* — Gene Crawford
*Assistant Examiner* — Keith R Campbell
(74) *Attorney, Agent, or Firm* — Paine Hamblen, LLP (57) ABSTRACT

An excited frame vibratory conveyor is described and which includes a base frame; a motor mount made integral and with the base frame; a pair of vibratory motors mounted on the motor mount; and an electrical circuit for energizing the pair of vibratory motors in a fashion which reduces movement of the base frame in a vertical direction.

6 Claims, 5 Drawing Sheets

EXCITED FRAME VIBRATORY CONVEYOR

TECHNICAL FIELD

The present invention relates to an excited frame vibratory conveyor, and more specifically, to a device which includes a novel motor mount which is made integral with a base frame, and which further mounts a pair of vibratory motors, and which are operable to impart reciprocal vibratory motion to a conveyor bed. The invention further includes an electrical circuit, which facilitates the synchronous operation of the vibratory motors employed with the present invention.

BACKGROUND OF THE INVENTION

Excited frame vibratory conveyors are known in the art. For example, the Office's attention is directed to U.S. Pat. No. 4,313,535, which is incorporated by reference herein, and which describes an exemplary excited frame conveying apparatus that has performed extremely well in the past, and which is useful for transporting bulk products over relatively short distances. While these earlier designed excited frame conveyors have operated with a great deal of success, shortcomings have been attendant to their individual designs, and which have limited their use to conveyors having relatively short bed lengths.

The Office is also invited to study U.S. Pat. No. 6,655,523, and which relates to an excited frame conveyor, and excitation process for same, and which is directed to an excited frame conveyor which is useful for conveying bulk product over increasingly longer distances. The teachings of this particular patent is noteworthy because it describes a synchronizing control for actuating the drive motors in a starting sequence and wherein the first motor is activated and allowed to progress to a predetermined RPM, that is associated with a minimal, lateral vibration of the conveyor bed. Thereafter, the second drive motor is activated approximately at the same predetermined RPM as that of the first motor. The drive assembly, which is provided, drives this novel reciprocal conveyor bed at an operating frequency which is greater than the first natural structural frequency of the frame during normal operation. In order to achieve the benefits as identified in U.S. Pat. No. 6,655,523. The drive assembly is activated so as to ensure minimum lateral (horizontal) movement of the frame. As described in this patent, a failure to minimize this lateral motion could result in the energized motors actually amplifying the lateral motion in an adverse manner, if the starting sequence is not followed. Various other designs of vibratory conveyors have also been taught and disclosed in the years which have passed since the issuance of U.S. Pat. No. 4,313,535. Examples of other designs of excited frame conveyors include U.S. Pat. Nos. 6,659,267; 5,265,730; 6,349,817; and 6,041,915 to name but a few. These prior art teachings are incorporated by reference herein.

Common among the deficiencies as seen in the prior art practices is that manufacturers must fabricate or provide relatively stiff or heavy base frames in order to prevent lateral, sideways motion of the frames, and conveyor beds, during operation of these devices. This requirement to provide a relatively stiff base frame comes with a price, that being, as the excited frame vibratory conveyor gets longer, the cost of fabricating the vibratory conveyor gets increasingly more expensive.

Attempts have been made to design and then fabricate various motor mounts and other vibratory engine mounting arrangements in order to reduce the costs of fabricating more expensive and heavy vibratory conveyors. While some of these efforts have been somewhat successful, problems remain relative to fabricating cost-effective, excited frame vibratory conveyors having increased lengths and reliability.

Additionally, experience in the field has demonstrated that as the vibratory motors have increased in horsepower, detrimental, vertical motion is sometimes imparted to the base frames upon the energizing of the respective motors. As might be expected, and understood by those skilled in the art, this vertical motion of the base frame is not advantageous, especially when such vibratory conveyor devices are located on overhead second, or mezzanine production or factory floors.

An excited frame vibratory conveyor, which addresses these and other shortcomings attendant with the prior art devices employed, heretofore, is the subject matter of the present application.

SUMMARY OF THE INVENTION

A first aspect of the present invention relates to an excited frame vibratory conveyor which includes a base frame having a longitudinal, transverse and vertical axes; a motor mount made integral with the base frame, and which has a top and bottom facing surface; a first and second vibratory motor which are individually mounted on the top and bottom facing surfaces of the motor mount; and an electrical circuit for energizing and de-energizing the respective vibratory motors so as to substantially reduce movement of the base frame along the vertical axis, and which is caused, at least in part, by the non-synchronous operation of the first and second vibratory motors.

Still another aspect of the present invention relates to an excited frame vibratory conveyor which includes a base frame having spaced, sidewalls; a plurality of elongated, planar biasing springs mounted on, and extending upwardly relative to, the respective sidewalls of the base frame; a vibratory conveyor bed mounted on the respective plurality of the elongated, planar biasing springs, and which is located in predetermined, spaced relation relative to the spaced sidewalls; a motor mount made integral with, and extending therebetween the respective sidewalls of the base frame, and wherein the motor mount has opposite end portions which are substantially vertically oriented, and an intermediate portion which is made integral with the opposite end portions of the motor mount, and which is acutely, angularly oriented relative thereto, and wherein the intermediate portion has an upwardly and a downwardly facing surface; first and second vibratory motors which are selectively energizable, and which individually mount a rotatable eccentric weight which have substantially similar masses, and wherein the respective first and second vibratory motors are individually mounted on the upwardly and downwardly facing surfaces of the motor mount; and an electrical circuit for selectively energizing and deenergizing the respective first and second vibratory motors so as to facilitate the synchronization of the respective vibratory motors, and which further substantially reduces any vertical movement of the base frame which is caused, at least in part, by the non-synchronous rotation of the respective eccentric weights which occurs upon the energizing or deenergizing of the respective first and second vibratory motors.

Still another aspect of the present invention relates to an excited frame vibratory conveyor which includes a base frame having a pair of vertically disposed sidewalls which are spaced apart a predetermined distance, and wherein the base frame has a top peripheral edge, a longitudinal axis, a transverse axis, and a vertical axis, and wherein the respective vertically disposed sidewalls have opposite first and second ends; a plurality of elongated biasing springs which each have a first end mounted adjacent to the top peripheral edge of the base frame, and an opposite, second end which extends outwardly relative to the top peripheral edge of the base frame, and wherein the respective elongated biasing springs are located in predetermined spaced relationship one relative to another; a vibratory conveyor bed mounted on the second end of the respective elongated biasing members, and which is further located in predetermined, spaced relationship relative to the top peripheral edge of the base frame, and wherein the vibratory conveyor bed has a center of mass, and is rendered reciprocally moveable along a predetermined path of travel which is substantially parallel with the longitudinal axis of the base frame by the respective elongated biasing springs; a motor mount mounted on the base frame, and extending between the pair of vertically disposed sidewalls thereof, and which is further located below the vibratory conveyor, and wherein the motor mount has a first, second and third portion, and wherein each portion has opposite ends, and which are further respectively made integral with the individual, vertically disposed sidewalls of the base frame, and wherein the first portion is substantially vertically oriented, and is located in spaced relationship relative to the first end of the respective vertically disposed sidewalls, and wherein the second portion is made integral with the first portion, and which is further acutely, angularly oriented relative to the first portion, and further positioned in a perpendicular relationship relative to the elongated biasing springs, and wherein the third portion is made integral with the second portion, and is oriented in a vertical orientation, and is further disposed in spaced relation relative to the first portion of the motor mount, and wherein the second portion has an upwardly and a downwardly facing supporting surface; a first vibratory motor mounted on the upwardly facing surface of the second portion of the motor mount, and wherein the first vibratory motor is selectively, electrically energizable, and further mounts a rotatable eccentric weight having a given mass; a second vibratory motor mounted on the downwardly facing surface of the second portion of the motor mount, and wherein the first vibratory motor is selectively, electrically energizable, and further mounts a rotatable eccentric weight having a mass which is substantially equal to that of the first eccentric weight, and wherein rotation of the eccentric weights by the respective first and second vibratory motors is effective in imparting a predetermined vibratory force along a force vector which passes through the center of mass of the vibratory conveyor bed, and wherein the predetermined vibratory force is effective in causing the vibratory conveyor bed to move along the predetermined path of travel; and an electrical circuit for selectively energizing the respective vibratory motors so as to achieve predetermined, synchronized rotation of the rotatable eccentric weights which are individually rotated by the respective first and second vibratory motors, and wherein the electrical circuit first energizes the first vibratory motor, and then after a predetermined time delay of less than about 1 second energizes the second vibratory motor, and wherein the selective energizing of the first and second vibratory motors substantially reduces any undesirable movement of the base frame along the vertical axis while the respective vibratory motors are energized or deenergized.

These and other aspects of the present invention will be discussed in greater detail hereinafter.

BRIEF DESCRIPTION OF THE DRAWING

Preferred embodiments of the present invention are described, below, with reference to the following accompanying drawings.

DETAILED DESCRIPTION OF THE PREFERRED EMBODIMENTS

This disclosure of the invention is submitted in furtherance of the constitutional purposes of the U.S. Patent laws "to promote the progress of science and useful arts." (Article I, Section 8).

Figure 1:
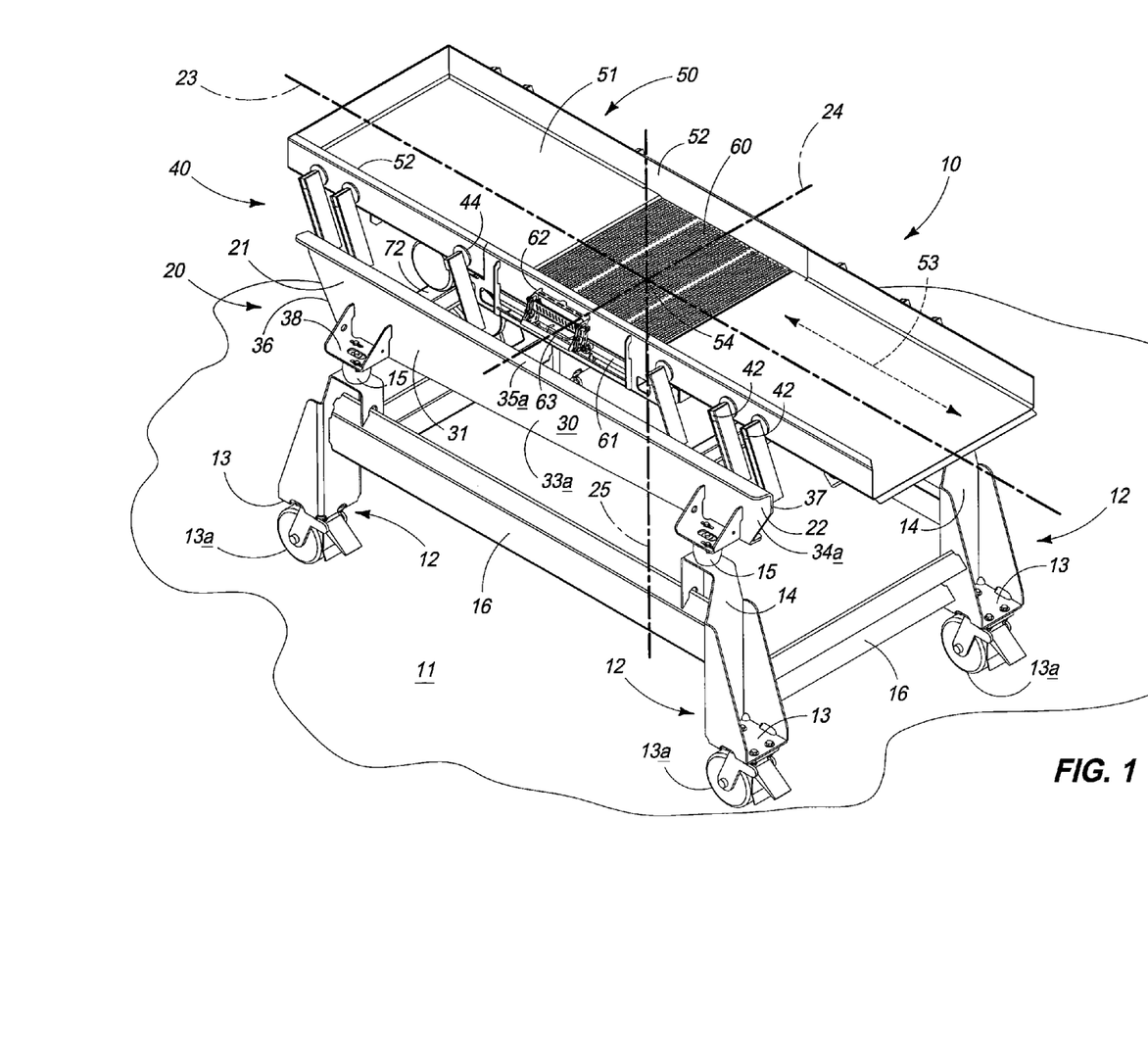
FIG. 1 is perspective, the side elevation view of an excited frame vibratory conveyor of the present invention.
Figure 2:
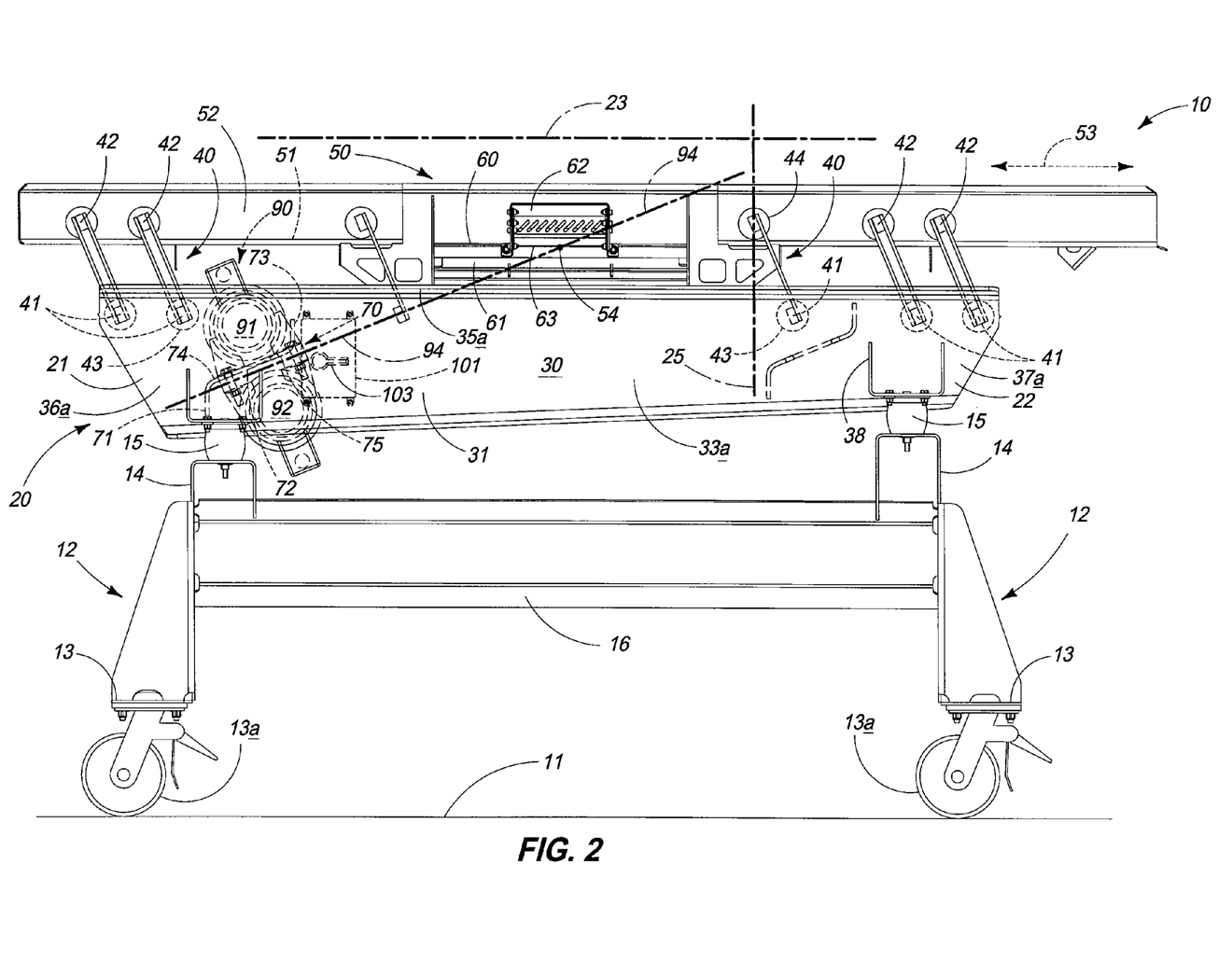
FIG. 2 is a side elevation view of the excited frame conveyor of the present invention.

The excited frame vibratory conveyor of the present invention is generally indicated by the numeral 10 in FIG. 1 and following. In this regard, the present invention 10 as shown in the drawings [FIG. 2] is positioned or otherwise supported on the surface of the earth or an underlying supporting floor which is generally indicated by the numeral 11. The present invention 10 further includes a multiplicity of supporting legs, here indicated by the numeral 12, and which supports the invention in spaced relation relative to the surface of the earth 11. The multiplicity of supporting legs 12, have a first end 13, which is positioned near the supporting surface 11. The first end 13 has affixed thereon individual casters 13A which allows the present invention 10 to be easily moved along the supporting surface 11. Additionally, each of the supporting legs 12 include a distal, upper, or second end 14. As seen in the drawings, and mounted near the second end 14 of the respective legs is a vibration isolator 15 of traditional design, and which is employed to reduce the amount of vibrational force transmitted by the invention 10 to the underlying supporting surface 12. As seen in FIGS. 1 and 2, the present invention 10 includes a multiplicity of substantially horizontally disposed and rigid leg reinforcing members 16 which span between the plurality of supporting legs in order to provide increased strength to the resulting invention 10.

The excited frame vibratory conveyor 10 of the present invention includes a base frame 20, which is mounted on the vibration isolators 15, and to the underlying plurality of supporting legs 12. The base frame 20 has a first end 21, and an opposite second end 22. Still further, as seen in the drawings, the base frame 20 is defined by a longitudinal axis which is indicated by the line labeled 23; a transverse axis, as indicated by the numeral 24; and a vertical axis as indicated by the numeral 25. Additionally, the base frame 20 is defined by a pair of spaced, substantially vertically disposed sidewalls 30. In this regard, the pair of sidewalls 30 includes a first, vertically disposed sidewall 31, and an opposite, second, vertically disposed sidewall 32. Additionally, the first and second sidewalls 31 and 32 each have an outside facing surface designated by the numerals 33A and B, respectively, and an opposite inside facing surface indicated by the numerals 34A and B, respectively. Additionally, the respective first and second sidewalls 31 and 32 each have a top peripheral edge 35A and B, respectively, and an opposite first and second ends 36 and 37 A and B, respectively. As seen most clearly by reference to FIG. 1, an outwardly facing mounting bracket 38 is affixed to the outside facing surfaces 33A and 33B of the respective first and second sidewalls 31 and 32, respectively. The mounting bracket 38 provides a means by which the base frame 20 may be suitably mounted on the respective vibration isolators 15, which are borne by the respective support legs 12.

As illustrated in the drawings, a plurality of the elongated, planar biasing springs 40 are mounted adjacent to the top peripheral edge 35A and 35B, and extend angularly, upwardly, relative thereto. These individual elongated, planar biasing springs 40 have a first end 41, which is mounted on the base frame 20, and an opposite, or second end 42. Additionally, as will be seen in the drawings, a first mounting fixture 43 is mounted adjacent to the top peripheral edge 35A and B of the respective first and second sidewalls 31 and 32. This first mounting fixture 43 suitably attaches or is affixed to the first end 41 of the respective biasing springs 40. Further, a second mounting fixture 44 is suitably attached to the distal, second end 42 thereof. As will be understood, the elongated planar biasing springs 40 provide a means for reciprocally supporting a vibratory conveyor bed, as will be discussed in the paragraphs below.

Mounted on and supported by the plurality of elongated planar biasing springs 40 is a vibratory conveyor bed, which is generally indicated by the numeral 50. The conveyor bed 50 is defined by a horizontally disposed product receiving pan, or tray, 51. As depicted, this horizontally disposed product receiving pan or tray is narrowly rectangular, and further includes spaced, substantially vertically disposed sidewalls, 52 which are positioned along the peripheral edge thereof. The conveyor bed 50 is reciprocally moveable along a path of travel which is indicated by the numeral 53, and further has a center of mass indicated by the point labeled 54. As seen in the drawings, the product receiving pan 51 has a foraminous portion 60, which facilitates the removal of liquid, and small particles, or other debris that might be mixed with a source of a bulk product to be sorted, not shown. As seen in the drawings, the present invention 10 includes a removable screen 61 which is located below the foraminous portion 60. As illustrated, the present invention 10 includes a releasable clamp 62. The releasable clamp 62 ensures the reliable securing of the removable screen 61 in gravity feeding relation relative to the foraminous portion 60. Additionally, the removable screen 61 includes a handle 63, which may be grasped by an operator (not shown), and which may be used to remove the screen 61 for emptying or disposal when appropriate. As seen in the drawings, the second mounting fixtures 44 are affixed to the respective spaced sidewalls 52 of the conveyor bed 50, and thereby supports the conveyor bed 50 in a predetermined, substantially parallel and horizontal relationship relative to the supporting surface 11.

Figure 3:
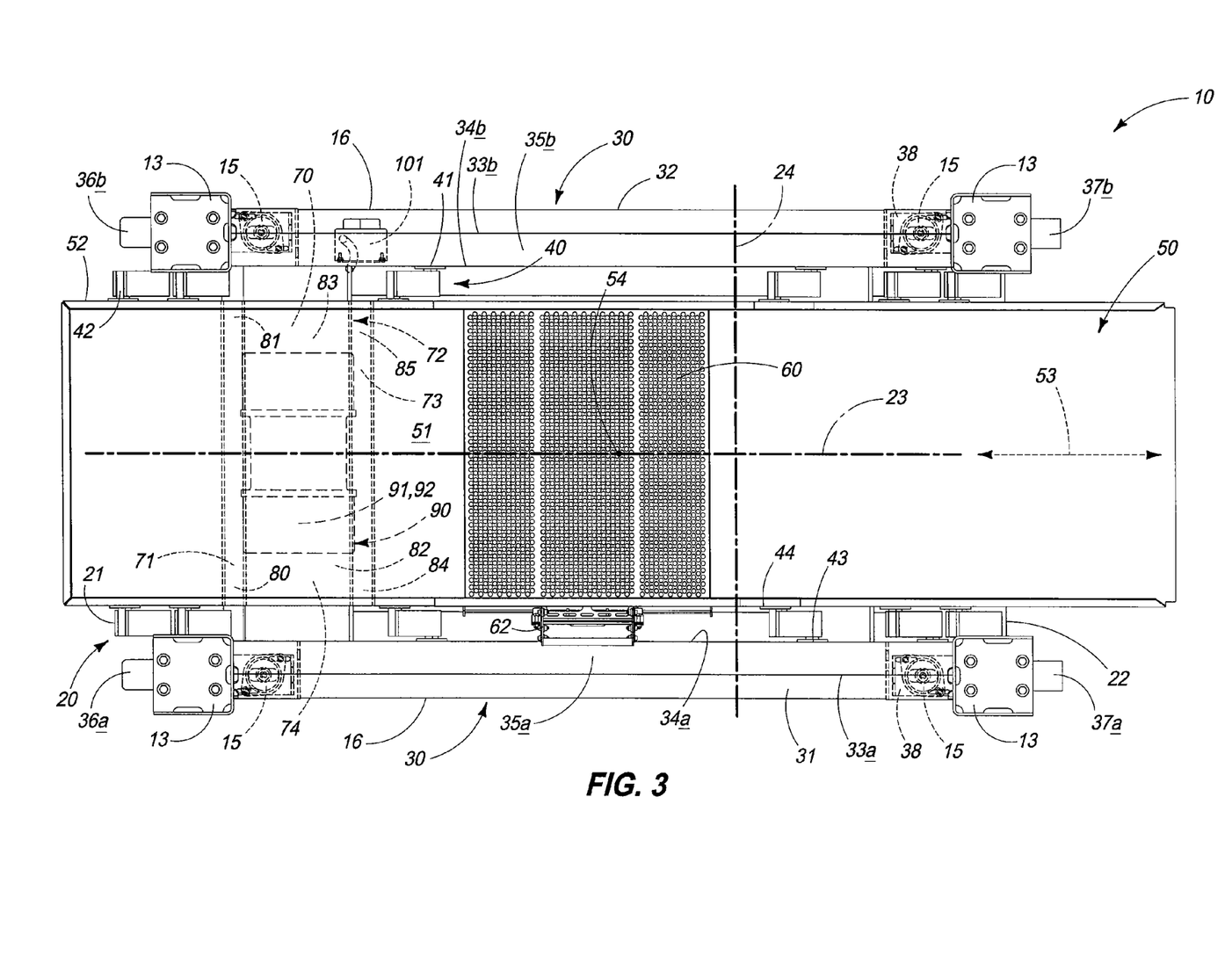
FIG. 3 is a top plan view of an excited frame vibratory conveyor of the present invention.
Figures 4, 4A:
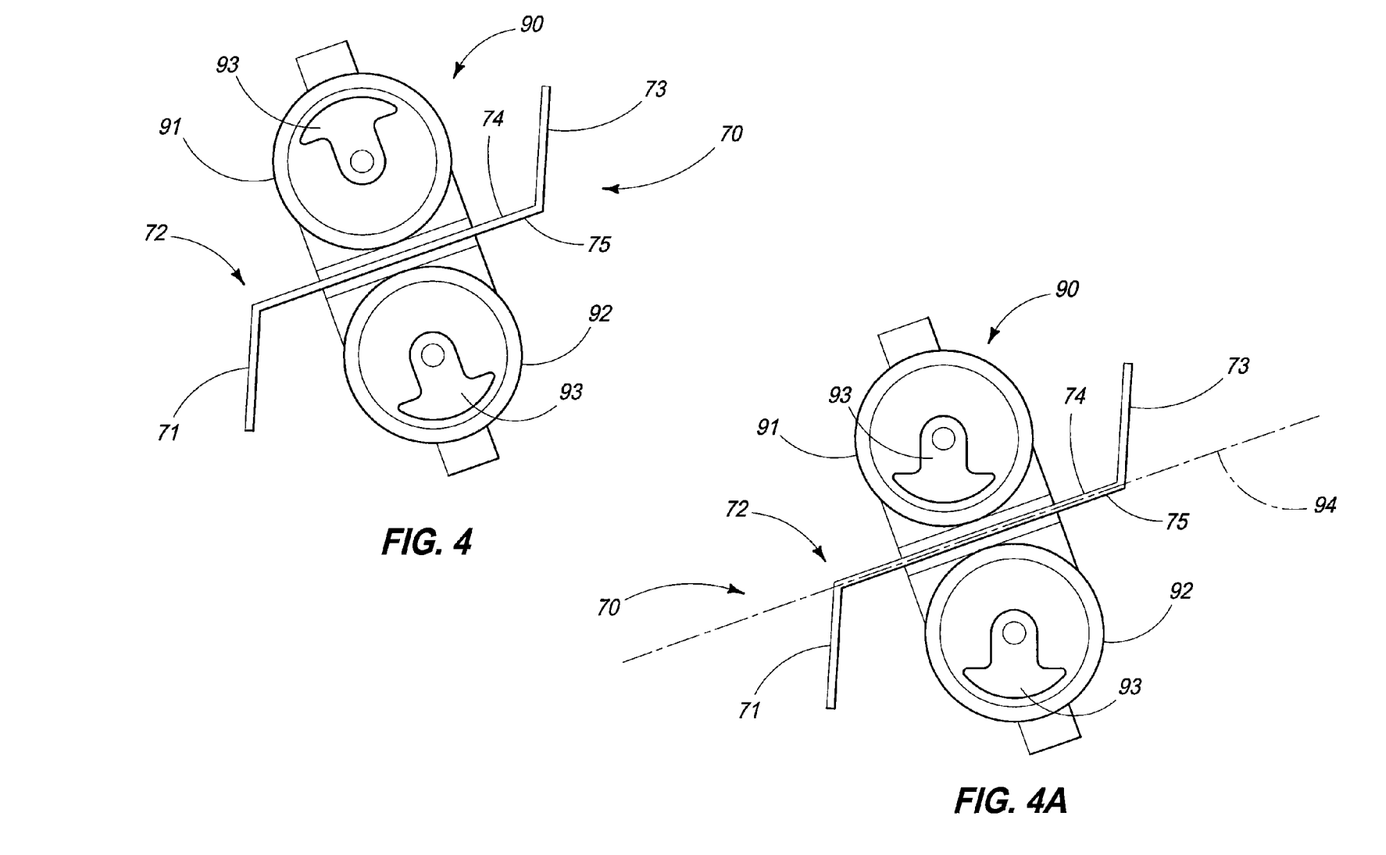
FIG. 4 is a fragmentary, side elevation view of a motor mount, and vibratory engine arrangement which finds usefulness in the present invention.
FIG. 4A is a second fragmentary side elevation view of the motor mount employed with the present invention.

The present invention 10 includes a motor mount which is generally indicated by the numeral 70, and which is mounted on the base frame 20, and which extends between the pair of vertically disposed sidewalls 31 and 32, respectively. As seen in the drawings, the motor mount 70 is further located below the vibratory conveyor bed 50. In this regard the motor mount 70 is generally Z-shaped (FIG. 4 and FIG. 4A) and is further defined by first, second and third portions 71, 72 and 73, respectively. As seen in the drawings, the second portion 72 defines an intermediate region or portion which has upwardly and downwardly facing surfaces 74 and 75, respectively (FIG. 3). In this regard, the first portion 71 has a first and second end 80 and 81, respectively. Further, the second or intermediate portion 72 has a first and second end 82 and 83, respectively, and further the third portion 73 has a first and second end 84 and 85, respectively. The respective opposite ends of the first and second portions 71 and 72 are made integral with the inside facing surface 34A and B, respectively, of the pair of sidewalls 30, which are defined by the first and second sidewalls 31 and 32, respectively. In this regard, the first portion 71 is substantially vertically oriented and is located in spaced relation relative to the first end 36A and B of the vertically disposed sidewalls 31 and 32, respectively. Further, the second portion 72 is made integral with the first portion 71, and which is further acutely, angularly oriented relative to the first portion (FIG. 4). This acute angle orientation is about 22.5 degrees when measured from the horizontal plane. The third portion 73 is made integral with the second portion 72, and is oriented in a vertical orientation and is further disposed in spaced relation relative to the first portion 71 of the motor mount 70. The second portion 72, as earlier disclosed, has an upwardly and a downwardly facing supporting surface 74 and 75, for receiving vibratory motors, as will be discussed in greater detail, below. This particular motor mount 70, and its given shape, provides rigidity to the base frame 20, so as to permit the excited frame vibratory conveyor base frame 20 to be fabricated from thinner gauge material than what has been possible, heretofore. Further, and as will be recognized, by a study of FIG. 1 and following, the angular orientation of the intermediate or second portion 72 is such that it lies along a line 94 which passes through the center of mass 54 of the overhead, vibratory conveyor bed 50. This facilitates the effective, reciprocal vibration of the conveyor bed 50 along the path of travel 53. (FIG. 2)

The present invention 10 includes a pair of vibratory motors which are generally indicated by the numeral 90, and which includes a first vibratory motor 91, and a second vibratory motor 92, which are individually affixed to the upwardly and downwardly facing surfaces of the second or intermediate portion 72 of the motor mount 70. The respective vibratory motors are substantially identical in design and each mounts a rotatable, eccentric weight 93. When selectively energized, as will be discussed below, the respective vibratory motors 90 rotate the individual eccentric weights 93 (FIG. 4) in a fashion so as to provide a vibratory force, which is directed along a force vector which is generally indicated by the numeral 94, and which extends substantially through the center of mass 54 of the vibratory conveyor 50. As seen in FIG. 4A, it will be noted that before energizing, the respective eccentric weights 93 tend to be positioned in an orientation vertically downwardly relative to the respective vibratory motors 90. This is a function of the fact that the respective vibratory motors are mounted on the intermediate portion 72 and which is angled at approximately 22.5 degrees from the horizontal plane.

Figure 5:
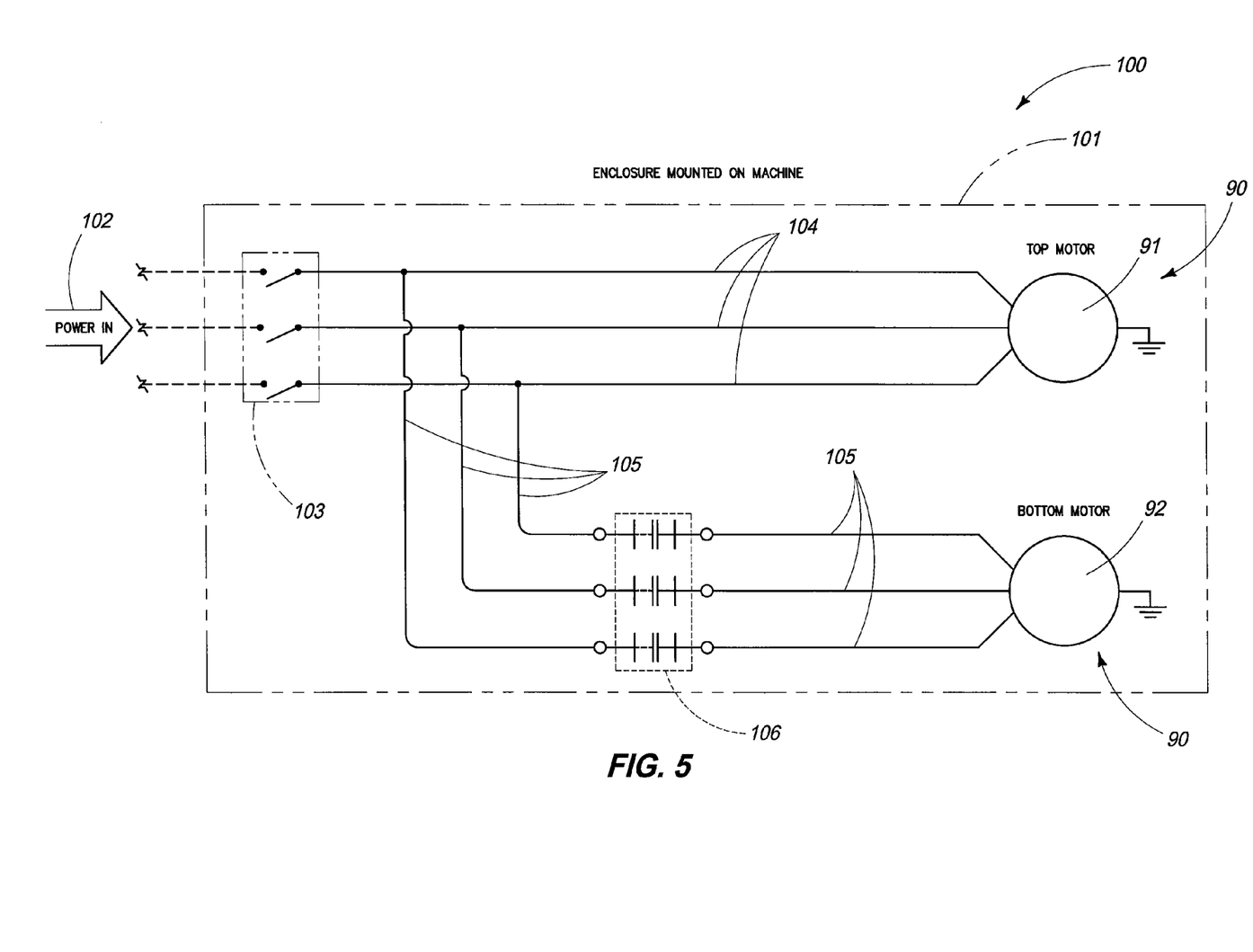
FIG. 5 is a schematic view of an electrical circuit which finds usefulness in the present invention.

Referring now to FIG. 5, the present invention includes an electrical circuit which is generally indicated by the numeral 100, and which is used for selectively energizing the respective vibratory motors 90, so as to achieve rapid, predetermined, synchronized rotation of the rotatable eccentric weights 93, by the respective first and second vibratory motors 91 and 92, respectively. The electrical circuit 100, as designed, first energizes the first vibratory motor 91, and then, after a predetermined time delay of less than about one second, energizes the second vibratory motor 92. The selective energizing of the first and second vibratory motor substantially reduces any undesirable movement of the base frame 20, along the vertical axis 25, while the respective vibratory motors are energized or de-energized. In this regard, the electrical circuit generally is enclosed within a housing, which is indicated by the numeral 101. This electrical housing is mounted on the base frame 20. Additionally, and as seen in FIG. 5, a source of electrical power 102 is provided to an electrical switch 103, which is operable to energize the respective vibratory motors 90, as described, above. Additionally, as will be seen, the electrical circuit has a first multiplicity of electrical conduits 104, which extend from the electrical switch 103, and to the first vibratory motor 91. Further, a second multiplicity of electrical conduits 105 is provided, and which extends to and are electrically coupled with a time delayed electrical contractor switch, and which is generally indicated by the numeral 106. This second plurality of electrical conduits then extend from the time delayed electrical contractor 106, to the second vibratory motor 92. In the arrangement as seen in the drawings, the time delayed electrical contractor 106 is operable to electrically couple the second vibratory motor 92 to the source of power 102 during a time delay, which is less than about one second, and preferably about 0.2 seconds after the electrical switch 103 energizes the electrical circuit 100. The inventors have discovered that by implementing this time delay, adverse vertical motion of the base frame 20 is avoided, and the synchronization of the rotation of the respective eccentric weights 93 is facilitated in a manner not possible, heretofore. As will be understood, vertical motion of the base frame is not very advantageous inasmuch as that a vibratory force may be transmitted into the underlying supporting surface 11, during the operation of the excited frame vibratory conveyor 10. Similarly on de-energizing of the electrical circuit 100, again, the first vibratory motor 91 is de-energized and then approximately less than about one second later, the second vibratory motor is de-energized. This again facilitates a reduction in any vibratory motion that may be imparted into the base frame 20.

Operation

The operation of the described embodiment of the present invention is believed to be readily apparent and is briefly summarized at this point.

In its broadest aspect, the present invention relates to an excited frame vibratory conveyor 10, which includes a base frame 20, having longitudinal, transverse and vertical axes which are generally indicated by the numerals 23, 24 and 25, respectively. Still further, the present invention includes a motor mount 70, which is made integral with the base frame 20, and which has an upwardly and a downwardly facing surface 74 and 75, respectively. The present invention also includes a first and second vibratory motor 91 and 92, respectively, and which are individually mounted on the upwardly and downwardly facing surfaces 74 and 75 of the motor mount 70. Still further, and in its broadest aspect, the present invention includes an electrical circuit 100 for energizing and de-energizing the respective vibratory motors 90, so as to substantially reduce movement of the base frame 20, along the vertical axis 25, and which is caused, at least in part, by the non-synchronous operation of the first and second vibratory motors.

More specifically, the present invention relates to an excited frame vibratory conveyor 10, which includes a base frame 20, having spaced sidewalls 30. Further, the invention includes a plurality of elongated, planar biasing springs 40, which are mounted on, and which extend upwardly relative to, the respective sidewalls 30 of the base frame 20. Additionally, the present invention 10 includes a vibratory conveyor bed 50 which is mounted on the respective plurality of elongated, planar biasing springs 40, and which is located in pre-determined, spaced relation relative to the spaced sidewalls 30. Additionally, the present invention 10 includes a motor mount 70 which is made integral with, and extends therebetween, the respective sidewalls of the base frame 20. The motor mount 70 has opposite end portions 71 and 73, respectively, and which are substantially vertically oriented; and an intermediate portion 72, which is made integral with the opposite end portions of the motor mount 70. The intermediate portion 72 is acutely, angularly oriented relative thereto. The intermediate portion 72 has an upwardly and a downwardly facing surface 74 and 75, respectively. In the present invention, first and second vibratory motors 91 and 92 are provided, and which were selectively energizable, and which individually mount a rotatable eccentric weight 93, which have substantially similar masses. The respective first and second vibratory motors 91 and 92 are individually mounted on the upwardly and downwardly facing surfaces 74 and 75 of the motor mount 70. Finally, the present invention includes an electrical circuit 100 for selectively energizing and de-energizing the respective first and second vibratory motors 91 and 92, so as to facilitate the synchronization of the respective vibratory motors 91 and 92, and which further substantially reduces any vertical movement of the base frame 20, which is caused, at least in part, by the non-synchronous rotation of the respective eccentric weights 93, which occurs upon the energizing or de-energizing of the respective first and second vibratory motors.

In the present arrangement, as seen in the drawings, the respective eccentric weights 93 which are rotated by the individual first and second vibratory motors 91 and 92 have a mass of less than about 5 pounds. Still further, in the arrangement as seen in drawings, each of the spaced sidewalls 30 are fabricated from a rigid metal substrate which has a gauge of less than about ⅜ inches. Additionally, and as earlier noted, the respective vibratory motors 90 are operable when energized to create a force vector which extends outwardly along a line 94 which intersects the center of mass 54 of the vibratory conveyor bed 50, and at an angle of about 22.5 degrees relative to a horizontal plane. In the arrangement as seen in the drawings, the first, second and third portions 71, 72 and 73 of the motor mount 70 each are fabricated from a metal substrate and have a gauge of greater than about ⅜ inches. As earlier noted, the motor mount 70 is substantially Z-shaped in cross-section and the rigidity of the motor mount 70 contributes to a resulting base frame 20, which can be fabricated from less expensive materials, and which provides assorted advantages for the present excited frame vibratory conveyor 10, which have not been possible, heretofore.

Therefore, it will be seen that the present invention provides an excited frame vibratory conveyor 10 having features and an overall performance which was not possible heretofore in vibratory conveyors of similar designs. The present invention is reliable, cost-effective, and may be energized, and de-energized, in a fashion not possible heretofore and avoids of the detriments associated with the prior art practices which were previously employed with devices of similar designs.

In compliance with the Patent Statute, the invention has been described in language more or less specific as to structural and methodical features. It should be understood, however, that the invention is not limited to the specific features shown and described since the means herein disclosed comprise preferred forms of putting the invention into effect. The invention is therefore claimed in any of its forms or modifications in the proper scope of the appended claims appropriate interpreted in accordance with the Doctrine of Equivalents.

We claim:

1. An excited frame vibratory conveyor, comprising:
   a base frame having spaced, sidewalls, and wherein the sidewalls are vertically disposed, and located in predetermined, spaced relation, one relative to the other, and wherein the sidewalls have inside facing surfaces, opposite first and second ends, and a top and bottom peripheral edge, and wherein the base frame is elongated in shape, and has a longitudinal, transverse and vertical axes;

a plurality of elongated, planar biasing springs mounted on, and extending upwardly relative to, the respective sidewalls of the base frame, and wherein the plurality of planar biasing springs have a first end which is mounted adjacent to the top peripheral edge of the respective sidewalls, and an opposite, second end which is located upwardly, and in spaced relation relative to the top peripheral edge;

a vibratory conveyor bed mounted on the respective plurality of the elongated, planar biasing springs, and which is located in predetermined, spaced relation relative to the spaced sidewalls, and wherein the second end of the respective plurality of planar biasing springs are each mounted on the vibratory conveyor bed, and the respective planar biasing springs render the vibratory conveyor bed reciprocally moveable along a predetermined path of travel which is located in substantially parallel, spaced relation relative to the longitudinal axis of the base frame, and wherein the vibratory conveyor bed has a center of mass;

a motor mount made integral with, and extending therebetween the respective sidewalls of the base frame, and wherein the motor mount has opposite end portions which are substantially vertically oriented, and an intermediate portion which is made integral with the opposite end portions of the motor mount, and which is acutely, angularly oriented relative thereto, and wherein the intermediate portion has an upwardly and a downwardly facing surface, and wherein the intermediate portion of the motor mount is oriented substantially perpendicular relative to the respective planar biasing springs, and wherein the opposite end portions of the motor mount include a first and a third portion, which are substantially identical in shape, and which are further located in predetermined spaced, substantially parallel relationship, one relative to the other, and are further disposed in substantially parallel relationship relative to the transverse axis of the base frame, and wherein each of the first and third portions of the motor mount has opposite ends which are immovably affixed to the inside facing surfaces of the respective spaced sidewalls of the base frame, and wherein the first portion is located in spaced relation relative to the first end of the respective sidewalls of the base frame, and adjacent to the bottom peripheral edge thereof, and wherein the third portion is located between the first and second ends of the respective spaced, sidewalls of the base portion, and adjacent to the top peripheral edge, and wherein the intermediate portion comprises a second portion which is immovably affixed to the respective spaced, sidewalls and affixed to, and located between, the first and third portions of the motor mount;

a first and second vibratory motors which are selectively energizable, and which individually mount a rotatable eccentric weight which have substantially similar masses, and wherein the respective vibratory motors are individually mounted on the upwardly and downwardly facing surfaces of the intermediate, second portion of the motor mount, and are further located in a substantially horizontal orientation relative to the transverse axis of the base frame, and wherein the respective vibratory motors, when energized, each exert a vibratory force which is directed along a force vector which passes substantially through the center of mass of the vibratory conveyor bed, and which is effective in imparting vibratory motion to the vibratory conveyor bed; and an electrical circuit for selectively energizing and deenergizing the respective first and second vibratory motors so as to facilitate the synchronization of the respective vibratory motors, and which further substantially reduces any vertical movement of the base frame which is caused, at least in part, by the non-synchronous rotation of the respective eccentric weights which occurs upon the energizing or deenergizing of the respective first and second vibratory motors.

2. An excited frame vibratory conveyor as claimed in claim 1, and wherein the respective eccentric weights which are rotated by the individual first and second vibratory motors have a mass of less than about 5 pounds.

3. An excited frame vibratory conveyor as claimed in claim 1, and wherein each of the spaced sidewalls are fabricated from a rigid substrate which has a gauge of less than about ⅜ of an inch.

4. An excited frame vibratory conveyor as claimed in claim 1, and wherein the force vector is about 22.5 degrees when measured from a horizontal plane.

5. An excited frame vibratory conveyor as claimed in claim 1, and wherein the first, second and third portions of the motor mount each have a gauge of greater than about ⅜ of an inch.

6. An excited frame vibratory conveyor as claimed in claim 1, and wherein the electrical circuit first energizes or deenergizes the first vibratory motor, and then energizes or deenergizes the second vibratory motor after a predetermined time delay of less than about 1 second, and wherein the predetermined time delay reduces any undesirable vertical movement of the base frame, and which is caused by the non-synchronous rotation of the eccentric weights, and which are rotated by the respective first and second vibratory motors, as the vibratory motors are energized or deenergized.

* * * * *